United States Patent
Stimson (10) Patent No.: US 9,715,516 B1
(45) Date of Patent: Jul. 25, 2017

(54) EDITION-BASED REDEFINITION FOR TABLES

(71) Applicant: Synchronoss Technologies, Inc., Bridgewater, NJ (US)

(72) Inventor: Stephen R. Stimson, Beverly Hills, FL (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 352 days.

(21) Appl. No.: 14/084,356

(22) Filed: Nov. 19, 2013

(51) Int. Cl.
*G06F 17/00* (2006.01)
*G06F 17/30* (2006.01)
*G06F 9/445* (2006.01)

(52) U.S. Cl.
CPC ........ *G06F 17/30339* (2013.01); *G06F 8/65* (2013.01)

(58) Field of Classification Search
CPC . G06F 17/30306; G06F 17/30339; G06F 8/65
See application file for complete search history.

(56) References Cited

U.S. PATENT DOCUMENTS

| 6,023,620 | A | 2/2000 | Hansson |
| 6,334,141 | B1 * | 12/2001 | Varma ................ H04L 12/1813 709/201 |
| 7,159,032 | B2 | 1/2007 | Jim et al. |
| 7,259,875 | B1 | 8/2007 | Mazza |
| 7,263,536 | B1 * | 8/2007 | Pederson .......... G06F 17/30321 |
| 7,624,376 | B1 | 11/2009 | Katzer et al. |
| 8,010,095 | B2 | 8/2011 | Natsuno et al. |
| 8,224,308 | B1 | 7/2012 | Gavrylyako et al. |
| 8,453,222 | B1 | 5/2013 | Newstadt et al. |
| 2005/0036443 | A1 * | 2/2005 | Collins ..................... G06F 8/60 370/216 |
| 2005/0246393 | A1 | 11/2005 | Coates et al. |
| 2006/0135127 | A1 | 6/2006 | Aarnio et al. |
| 2006/0199599 | A1 | 9/2006 | Gupta et al. |
| 2006/0218123 | A1 * | 9/2006 | Chowdhuri ....... G06F 17/30445 |
| 2006/0248036 | A1 | 11/2006 | Stanev et al. |

(Continued)

OTHER PUBLICATIONS

Building IDL Applications: Files and Input/Output; IDL Online Help; Jun. 16, 2005; As found on the internet at: http://northstar-www.dartmouth.edu/doc/idl/html_6.2/Formatted_and_Unformatted_InputOutput.html.

*Primary Examiner* — Tarek Chbouki
(74) *Attorney, Agent, or Firm* — Synchronoss Technologies, Inc.; Frederick W. Dour (57) ABSTRACT

Embodiments of the present invention are directed to an improved apparatus, system and method of edition-based redefinition for tables. When a new edition of an application is created, editions on the tables pertaining to the application are created. These tables typically store application configuration/reference data that control what the application does. These tables are altered to contain a new "edition" column. Keys on these tables include the "edition" column. Each table is partitioned on the "edition" column such that cleaning up data used by an edition is easy. Views are created on these tables, which make the "edition" column invisible by the application while ensuring that only data that can be accessed is the data for the correct edition. The current "edition" of the application stays fully operational while the application is upgraded because the configuration data in the tables does not change until the new "edition" is turned on.

19 Claims, 5 Drawing Sheets

(56) References Cited

U.S. PATENT DOCUMENTS

| | | | |
|---|---|---|---|
| 2008/0051071 A1 | 2/2008 | Vishwanathan et al. | |
| 2008/0098046 A1* | 4/2008 | Alpern | G06F 17/30306 |
| 2009/0106267 A1 | 4/2009 | Bumgarner et al. | |
| 2009/0150367 A1 | 6/2009 | Melnik et al. | |
| 2010/0010906 A1 | 1/2010 | Grecia | |
| 2010/0100696 A1* | 4/2010 | Suzuki | G06F 3/0625 |
| | | | 711/162 |
| 2011/0125745 A1* | 5/2011 | Bright | G06F 17/30339 |
| | | | 707/737 |
| 2011/0302242 A1 | 12/2011 | Kim et al. | |
| 2012/0310889 A1 | 12/2012 | McNeil et al. | |
| 2012/0310896 A1 | 12/2012 | Freedman et al. | |
| 2013/0086381 A1 | 4/2013 | Thomas et al. | |
| 2013/0166556 A1* | 6/2013 | Baeumges | G06F 17/30598 |
| | | | 707/737 |
| 2014/0095449 A1* | 4/2014 | Marwah | G06F 17/30073 |
| | | | 707/668 |
| 2014/0101646 A1* | 4/2014 | Buzaski | G06F 17/30174 |
| | | | 717/168 |

\* cited by examiner

EDITION-BASED REDEFINITION FOR TABLES

FIELD OF THE INVENTION

The present invention relates to an improved apparatus, system and method of edition-based redefinition for tables.

BACKGROUND OF THE INVENTION

An application upgrade normally involves both code and database changes. Traditionally, during an application upgrade, the application is shut down to enable changes to database objects and to upgrade application program(s) that had been modified. The database objects and the application program(s) are typically changed at the same time. Upgrading an application can be very difficult and time consuming. However, some systems, such as a customer support system, must be available most of, if not all, the time. For reasons of availability, a long downtime to upgrade the application is undesirable. There is a need to minimize downtimes or to maintain continuous operations during scheduled maintenance sessions.

Oracle's Edition-Based Redefinition (EBR) is a solution that reduces downtime during an application upgrade. In particular, EBR allows an administrator to make physical schema changes while the pre-upgrade application is online. Only once all changes are completed and tested is the post-upgrade application made available to users.

While EBR allows for installation of a post-upgrade application with reduced application downtime, EBR still leaves a gap in implementing online upgrades. EBR allows only structural changes to a table, such as adding and deleting columns. Data within the table cannot be versioned. Yet, there are times when a post-upgrade application relies on a set of data that is different from what its pre-upgrade application relies on. A new column can be added to the table and its data relied on by the post-upgrade application. The pre-upgrade application does not see this new column and is unaffected by this change. However, this solution is not ideal as the amount of data in the table can become large and complex very fast. Cleaning up thereafter to remove unused column(s) can be a long, tedious and difficult task, especially if numerous tables are involved. Care must be given when removing a column(s) since a previous version of the application may still be running that relies on the data in that column(s), causing the previous version of the application to operate in an improper manner or abnormally terminate if that column(s) is removed from the table.

SUMMARY OF THE INVENTION

Application upgrades are typically major events planned well in advance. Some sites do not permit a full application outage. The present invention advantageously maintains continuous operations during scheduled maintenance activities. Embodiments of the present invention are directed to an improved apparatus, system and method of edition-based redefinition for tables. Generally, the present invention provides an automated way to dynamically alter at least a subset of tables to make them operate with a new edition of an application. The present invention allows not only changes in the definition of data, if any, but also allows physical changes to the data values. When a new edition of an application is created, editions on the tables pertaining to the application are also created. These tables typically store and maintain application configuration/reference data that control what the application does. These tables are altered to contain a new "edition" column. The keys on these tables include the "edition" column. Each table is partitioned on the "edition" column such that cleaning up any data used by an edition is easy. Views are created on these tables, which make the "edition" column invisible by the application while ensuring that the only data that can be accessed is the data for the correct edition. The current "edition" of the application stays fully operational while the application is upgraded because the configuration data in the tables does not change until the new "edition" is turned on.

In one aspect, a non-transitory computer-readable medium storing instructions that cause the computing device to perform a method when executed by a computing device. The method includes creating an edition column in a table. The edition column indicates an edition of an application. The method includes setting an initial value in the edition column. The initial value typically indicates a first edition of the application. The method includes modifying keys on the table to include the edition column. The keys typically include primary and foreign keys. The method also includes dividing the table into partitions. Each partition contains data relevant to a respective edition of the application. Data in a partition is able to differ from data in another partition.

In some embodiments, dividing the table into partitions includes creating a back up of the table, creating a new definition for the table to include specifications for a new partition, and copying relevant data from the back up. The relevant data is typically for an updated edition of the application. These specifications include information regarding how to make a duplicate copy of a set of data, how each duplicate is stored and masked from other editions of the application.

In some embodiments, the method also includes creating at least one view based on the edition column. Typically, each view does not include the edition column.

In another aspect, a computer readable storage medium store a program of instructions executable by a processor for performing a method. The method includes receiving a table name. In some embodiments, the table name is input by a user. In other embodiments the table name is automatically generated. The method further includes creating a new partition in a table having the table name. Typically, the new partition contains data for a new edition of an application. In some embodiments, the data are configuration and reference data used by the new edition of the application. In some embodiments, the method further includes creating a view for the new edition of the application. The view is typically configured to exclude data not added for use by the new edition of the application.

In yet another aspect, a method is for upgrading an application online. The method includes uploading an upgraded edition of an application on an application server and updating one or more tables associated with the application in a database, thereby maintaining a plurality of sets of data. Typically, each table is divided into partitions, which includes at least a first partition accessible by a current edition of the application and a second partition accessible by the upgraded edition of the application. The method also includes creating a new view for each table. The view is typically accessible only by the upgraded edition of the application. The method also includes making the upgraded edition available to users while the current edition of the application is also accessible by the users. In some embodiments, the method further includes removing accessibility of the current edition of the application. In some embodiments, the method further includes cleaning up data in the one or more tables used by a previous edition of the application.

In yet another aspect, a system includes an application server, a database and a redefinition tool. The application server includes an application having a first edition and a second edition. In some embodiments, the first edition and the second edition are concurrently accessible by users. The application server also includes a database that includes at least one table, and a redefinition tool. Typically, the redefinition tool is configured to partition each table such that each partition contains data relevant to its respective edition of the application, and to create a view for a new edition of the application. The view typically corresponds to a partition relevant to the new edition of the application. In some embodiments, the redefinition tool allows data values of an existing column in a partition to be modified. In some embodiments, the redefinition tool allows data definitions in a partition to be modified.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Application upgrades are typically major events planned well in advance. Some sites do not permit a full application outage. The present invention advantageously maintains continuous operations during scheduled maintenance activities that include application upgrades. Embodiments of the present invention are directed to an improved apparatus, system and method of edition-based redefinition for tables. Generally, the present invention provides an automated way to dynamically alter at least a subset of tables to make them operate with of a new edition of an application. The present invention allows not only changes in the definition of data, if any, but also allows actual changes to the data values. When a new edition of an application is created, editions on the tables pertaining to the application are also created. These tables typically store and maintain application configuration/reference data that control what the application does. These tables are altered to contain a new "edition" column. The keys on these tables include the "edition" column. Each table is partitioned on the "edition" column such that cleaning up any data used by an edition is easy. Views are created on these tables, which make the "edition" column invisible by the application while ensuring that only data that can be accessed is the data for the correct edition. The current "edition" of the application stays fully operational while the application is upgraded because the configuration data in the tables does not change until the new "edition" is turned on.

Figure 1:
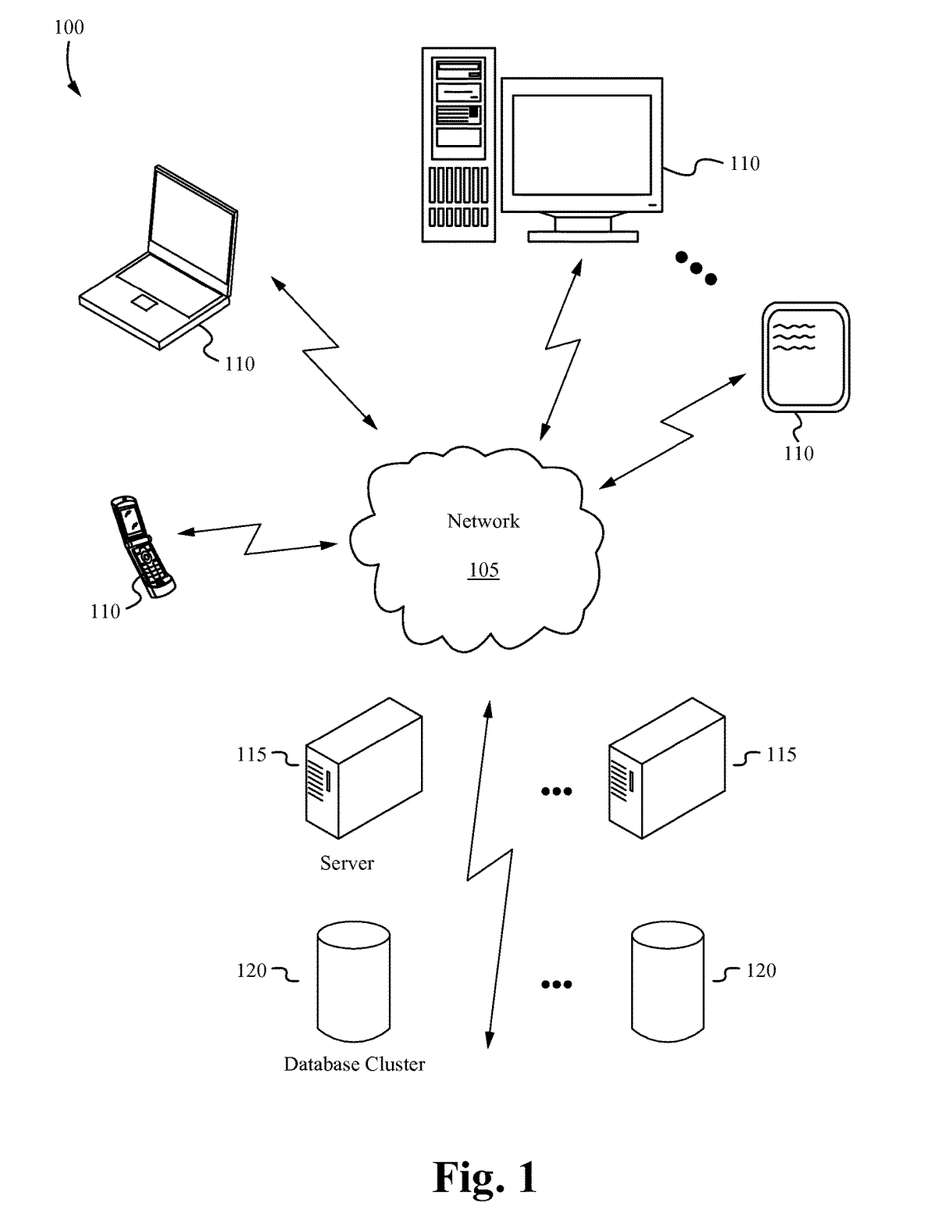
FIG. 1 illustrates an overview of an exemplary system for implementing an embodiment of the present invention.

FIG. 1 illustrates an overview of an exemplary system 100 for implementing an embodiment of the present invention. As shown in FIG. 1, the system 100 includes at least one client device 110. A client device 110 can be a mobile device, a personal computer, a tablet or any suitable network-enabled device. A client device 110 is communicatively coupled with a network 105, and is configured to receive and/or send data from/to one or more servers 115 via the network 105. It will be understood that the network 105 can be a LAN network, a WLAN network, a WAN network, a MAN network, an Internet network, a cellular network maintained by a cellular carrier, such as a GSM or CDMA network, and/or some other wired or wireless communications link. The one or more servers 115 are coupled with a database storage device such as a data base cluster 120 comprising at least one database. Users are able to use client devices 110 to access an application stored on a server 115.

Figure 2:
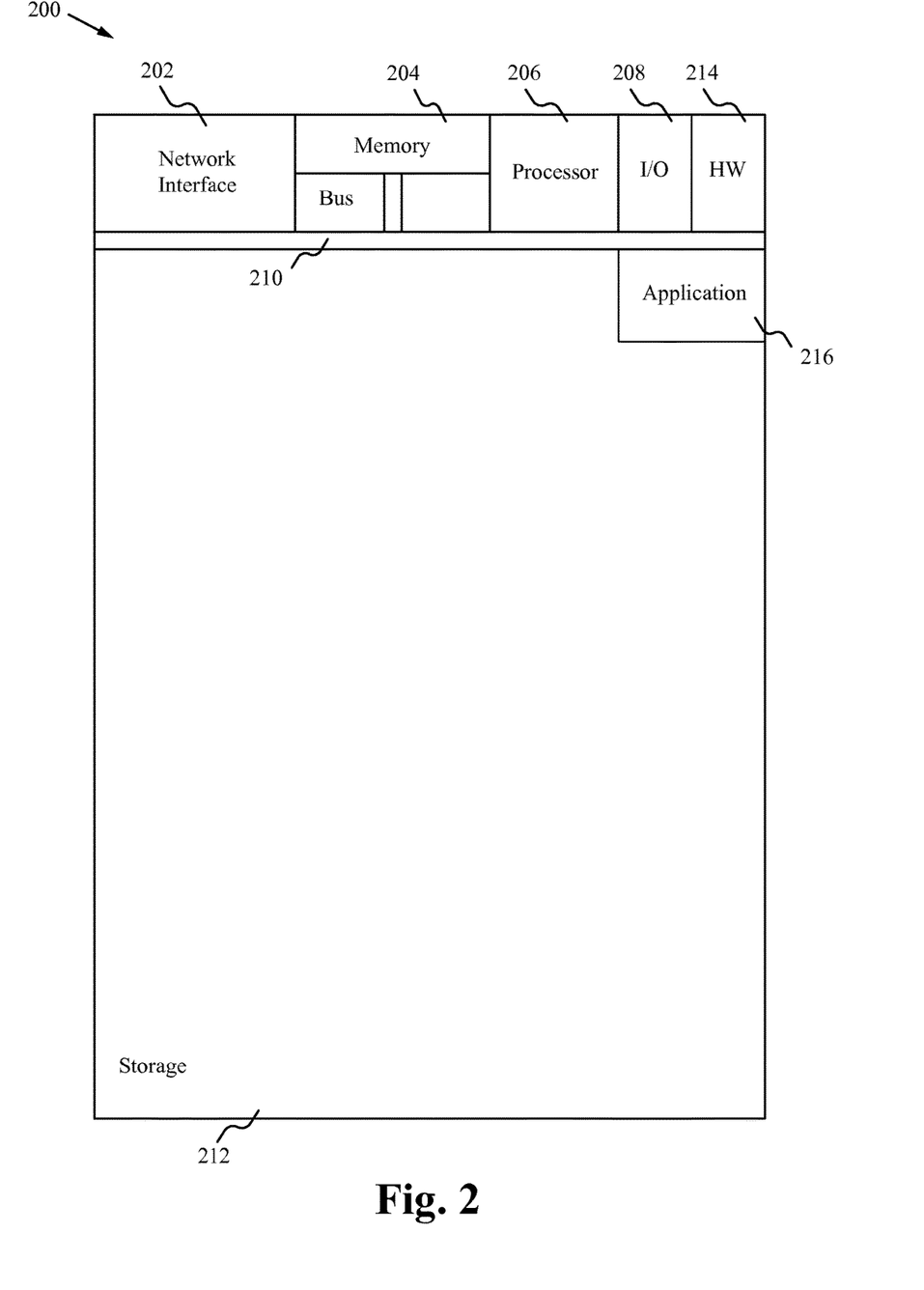
FIG. 2 illustrates a block diagram of an exemplary computing device configured to implement a method of edition-based redefinition for table, in accordance with the present invention.

FIG. 2 illustrates a block diagram of an exemplary computing device 200 configured to implement a method of edition-based redefinition for table, in accordance with the present invention. The computing device 200 is able to be used to acquire, cache, store, compute, search, transfer, communicate and/or display information. For example, the computing device 200 is a client device configured to access content. For another example, the computing device 200 is able to store an application accessible by a client device. For yet another example, the computing device 200 is able to execute procedures to redefine database tables.

In general, a hardware structure that is suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 216 used to perform the table redefinition procedures are preferably stored in the storage device 212 and memory 204 and are processed by the processor 206. More or less components shown in FIG. 2 are able to be included in the computing device 200. In some embodiments, hardware 216 for table redefinition is included. Although the computing device 200 in FIG. 2 includes applications 216 and hardware 214 for table redefinition procedures, the table redefinition procedure is able to be implemented on a computing device in hardware, firmware, software or any combination thereof.

Figure 3:
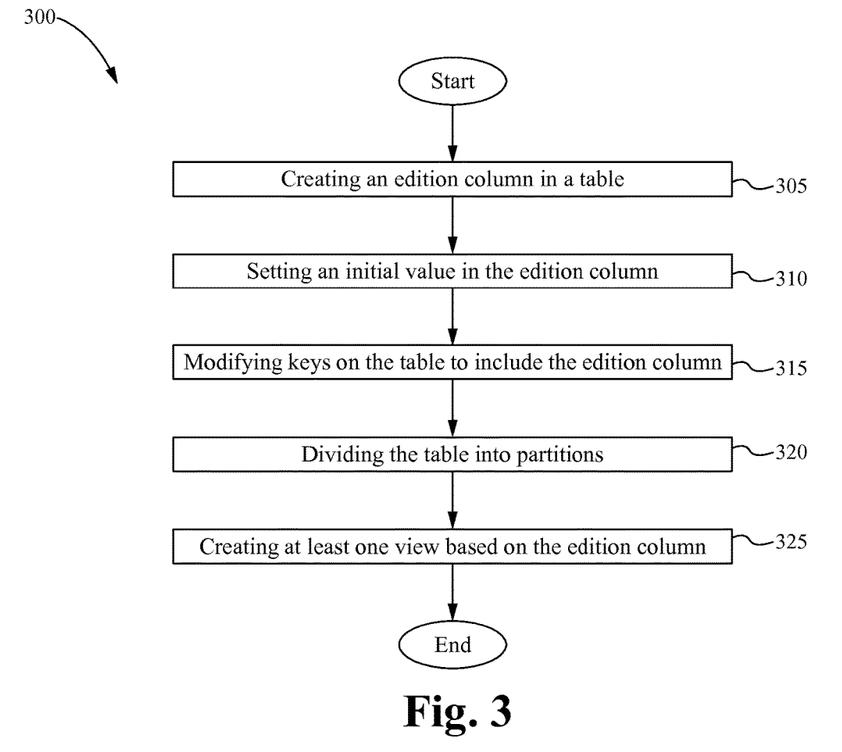
FIG. 3 illustrates an exemplary method of creating a new view for an updated edition of an application the first time the application is editioned, in accordance with the present invention.

FIG. 3 illustrates an exemplary method 300 of creating a new view of an updated edition of an application when the application edition is upgraded, in accordance with the present invention. At a step 305, an edition column is created in a table pertaining to the application. At a step 310, an initial value is set in the edition column. In some embodiments, the initial value indicates a first edition of the application (e.g., 1). As discussed elsewhere, the edition column is added to maintain multiple sets of data in the table such that a first edition of the application can only see data corresponding to Edition#1, and a second edition of the application can only see data corresponding to Edition#2.

At a step 315, keys are altered to include the edition column. Typically, the keys include both primary and foreign keys. Primary keys typically enforce entity integrity by uniquely identifying entity instances. Foreign keys typically enforce referential integrity by completing an association between two entities.

Figure 4:
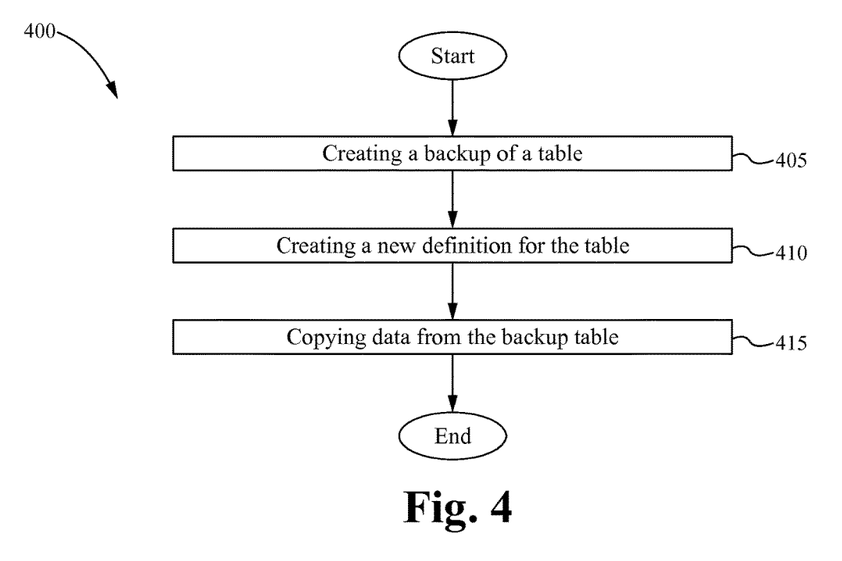
FIG. 4 illustrates an exemplary method of dividing a table into partitions, in accordance with the present invention.

At a step 320, the table is divided into partitions. FIG. 4 illustrates an exemplary method 400 of dividing a table into partitions, in accordance with the present invention. At a step 405, a back up of the table is created. At a step 410, a new definition for the table is created to include specifications for the partitions. Typically, the specifications include information regarding how to make a duplicate copy of a set of data, how each duplicate is stored and masked from other editions of the application. For example, the edition column for this set of data is set to indicate the next edition of the application (e.g., 2). At a step 415, pertinent data for the next edition of the application from the back up table is copied into the table. After the step 415, the method 400 ends.

Each partition is typically used to contain data for a single edition. Data in one partition can differ from data in another partition. This makes removing data for an edition easy once an edition of the application has been fully implemented. The cleanup is done with a single command (e.g., alter table xxx drop partition Edition#1). In some embodiments, an edition of the application is not removed until it is at least two editions prior to the current version of the application.

Returning to FIG. 3, at a step 325, at least one view is created for the table based on the edition column. Typically, the view created is for the updated or the next edition of the application. This view does not return the edition column to the application and makes sure that data returned by the view only returns data for the required edition. After the step 325, the method 300 ends.

In some embodiments, the method 300 is repeated for each and every table that pertains to the application. Alternatively, each step of method 300 is concurrently applied to each and every table that pertains to the application. The application does not necessarily have to change and does not know that the masking has occurred. In some embodiments, the method 300 is done dynamically by a single procedure. The current edition of the application typically stays fully operational while the application is upgraded because data in the table does not change until the new edition is turned on.

Figure 5:
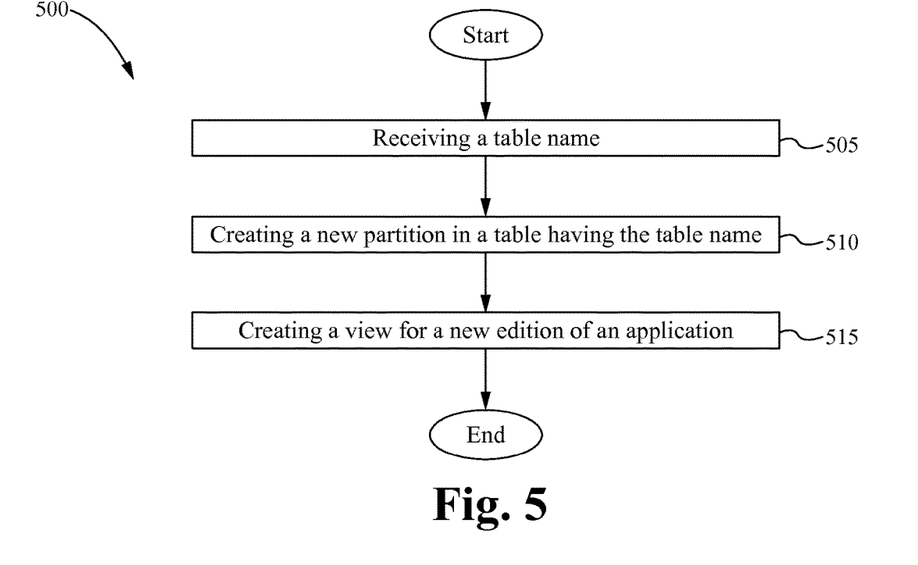
FIG. 5 illustrates an exemplary method of automating partitioning of a table, in accordance with the present invention.

FIG. 5 illustrates an exemplary method 500 of automating partitioning of a table, in accordance with the present invention. At a step 505, a table name as input by an administrator is received. At a step 510, a new partition in a table having the table name is created based on specifications. In some embodiments, the specifications are input by the administrator or read from one or more files. The new partition contains data for a new edition of an application. Data in the new partition typically differs from data in other partitions. In some embodiments, the data are configuration and reference data used by the new edition of the application. These data instruct the application what to do. For example, a pre-upgrade application relies on data in column F that instructs the pre-upgrade application to send results to location X, while a post-upgrade application relies on a second set of data, also in column F, that instructs the post-upgrade application to send results to location Y. At an optional step 515, a view is created for the new edition of the application. The view is configured to exclude data not for the new edition of the application. After the step 515, the method 500 ends.

Figure 6:
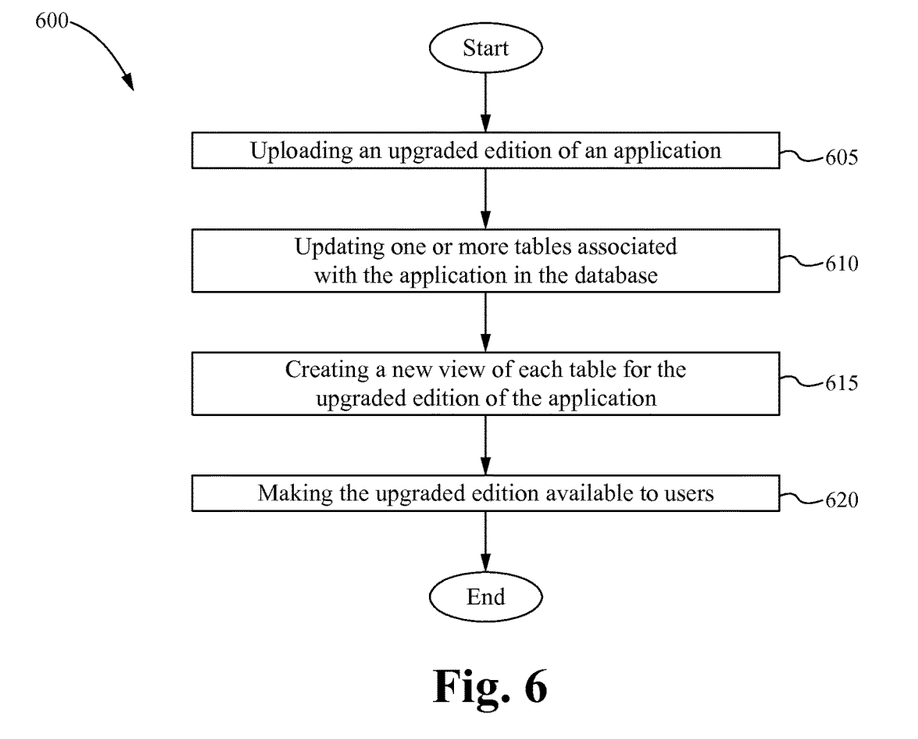
FIG. 6 illustrates an exemplary method of upgrading an application online, in accordance with the present invention.

FIG. 6 illustrates an exemplary method 600 of upgrading an application online, in accordance with the present invention. At a step 605, an upgraded edition of an application is uploaded onto a server. At a step 610, one or more tables in a database associated with the application are updated. As discussed elsewhere, for all the tables associated with the application, each table is divided into partitions. Typically, the partitions include a first partition accessible by a current edition of the application and a second partition accessible by the upgraded edition of the application. At a step 615, a new view of each table is created for the new edition of the application. Typically, the new view(s) is accessible only by the upgraded edition of the application. At a step 620, the upgraded edition is made available to users (e.g., public). After the step 620, the method 600 ends.

Typically, the upgraded edition and the current application are concurrently live. When it is determined to fully switch over to the upgraded edition, the current edition can be made inaccessible by the public. As discussed above, the tables can be cleaned up such that any set of data from the tables can be removed by using the edition column (e.g., alter table xxx drop partition Edition#1). In some embodiments, an edition of the application is not removed until it is at least two editions prior to what the application is currently using.

Figure 7:
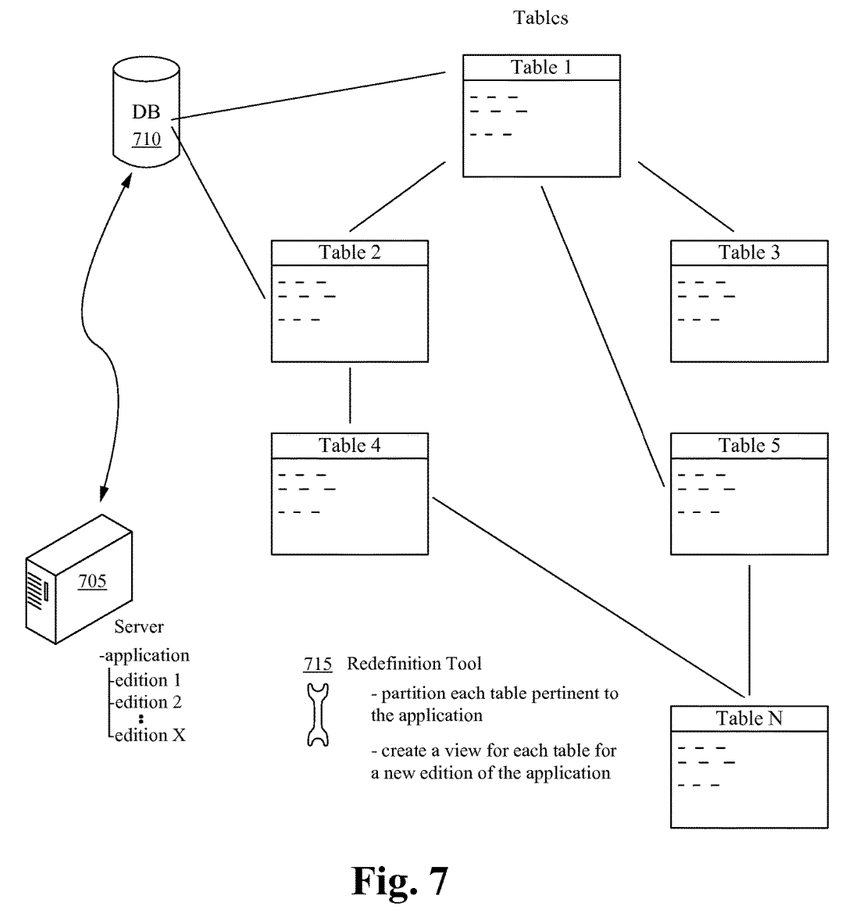
FIG. 7 illustrates a subset of components within the system, in accordance with the present invention.

FIG. 7 illustrates a subset of components within the system, in accordance with the present invention. The components include at least one server 705 configured to store a plurality of editions of an application. The plurality of editions include at least a first edition and a second edition, which are concurrently accessible by users for a predetermined length of time. The components also include at least one database 710 configured to store tables pertinent to the application. The components also include a redefinition tool 715, which enables upgrading the application online. The redefinition tool 715 is configured to partition each table such that each partition contains data relevant to a respective edition of the application. The redefinition tool 715 also creates a view of each table for each edition of the application. Typically, each view corresponds to a partition. The redefinition tool allows data values of an existing column in a partition to be modified. The redefinition tool also allows data definitions in a partition to be modified.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

I claim:

1. A non-transitory computer-readable medium storing instructions that, when executed by a computing device, cause the computing device to perform a method of updating an online application without interrupting operation of the application during the upgrade from a pre-updated edition to an updated edition of the application, the method comprising:
    creating an edition column in a table that is used by the application, wherein the edition column indicates an edition of the application;
    setting an initial value in the edition column;
    modifying keys on the table to include the edition column;
        forming a plurality of partitions in the table, wherein each of the partitions in the table contains different data, each of the different data relevant to the edition of the application associated with the partition as indicated by the edition column, and wherein the data are configuration data and reference data used by the respective edition of the application controlling the application's behavior, wherein one of the partitions in the table is for the updated edition of the application and includes content populated based on content in another of the partitions in the table that is for the pre-updated edition of the application;
        concurrently providing two views of the application to thereby maintain continuous operation of the application until a full switch over to the updated edition of the application occurs, wherein one of the views corresponds to the one partition in the table and is accessible by the updated edition of the application, and another of the views corresponds to the another partition in the table and is accessible by the pre-updated edition of the application; and
        removing a partition in the table that is associated with an edition preceding the updated edition via the edition column in the table, thereby removing accessibility of the edition preceding the updated edition.

2. The non-transitory computer-readable medium of claim 1, wherein data in a partition differs from data in another partition.

3. The non-transitory computer-readable medium of claim 1, wherein the initial value indicates a first edition of the application.

4. The non-transitory computer-readable medium of claim 1, wherein the keys include primary and foreign keys.

5. The non-transitory computer-readable medium of claim 1,
    wherein forming a plurality of partitions in the table comprises:
    creating a back up of the table;
    creating a new definition for the table to include specifications for a new partition; and
    copying relevant data from the back up into the new partition of the table, the relevant data for the updated edition of the application.

6. The non-transitory computer-readable medium of claim 5, wherein the specifications include information regarding how to make a duplicate copy of a set of data, how each duplicate is stored and masked from other editions of the application.

7. The non-transitory computer-readable medium of claim 1, the method further comprising creating at least one view based on the edition column.

8. The non-transitory computer-readable medium of claim 7, wherein each view does not include the edition column.

9. A computer readable storage medium tangibly embodied thereon a program of instructions executable by a processor for performing a method of updating an online application without interrupting operation of the application during the upgrade from a pre-updated edition to an updated edition of the application, the method comprising:
    receiving a table name, wherein the table name is associated with a table that is used by the application;
    creating a new partition in the table having the table name, wherein the new partition in the table is created based on a previous partition in the table and contains data for the updated edition of the application, wherein the previous partition in the table contains data for the pre-updated edition of the application and wherein the data are configuration data and reference data used by each edition of the application controlling the application's behavior;
    concurrently providing two views of the application to thereby maintain continuous operation of the application until a full switch over to the updated edition of the application occurs, wherein one of the views corresponds to the new partition in the table and is not accessible to the pre-updated edition of the application, and another of the views corresponds to the previous partition in the table and is not accessible to the updated edition of the application; and
    removing a partition in the table that is associated with an edition preceding the updated edition, thereby removing all data in the table that is used by the edition preceding the updated edition.

10. The computer readable storage medium of claim 9, wherein the table name is input by a user.

11. The computer readable storage medium of claim 9, wherein the data in each partition are configuration and reference data used by the one of the editions of the application.

12. A method of updating an online application without interrupting operation of the application during the upgrade from a pre-updated edition to an updated edition of the application, the method comprising:
    updating one or more tables associated with the application in the database, thereby maintaining a plurality of sets of data, wherein the updating includes, for each of the tables, forming in a respective table a plurality of partitions including a first partition that has a first set of data accessible by the pre-updated edition of the application and also including a second partition that has a second set of data accessible by the updated edition of the application, wherein the second set of data is different from the first set of data application and wherein the data are configuration data and reference data used by each edition of the application controlling the application's behavior;
    creating a new view for each of the tables, wherein the new view corresponds to the second partition and is accessible only by the upgraded edition of the application and is different from an old view corresponding to the first partition that is accessible only by the pre-upgraded edition of the application;
    concurrently providing the old view and the new view for each of the tables, thereby making the updated edition available to users while the pre-updated edition of the application is also accessible by the users so as to maintain continuous operation of the application; and removing a partition in each table that is associated with an edition preceding the updated edition, thereby removing all data in each table that is used by the edition preceding the updated edition.

13. The method of claim 12, further comprising removing accessibility of the pre-updated edition of the application.

14. The method of claim 13, further comprising cleaning up data in the one or more tables used by the pre-updated edition of the application.

15. A system comprising:
an application having a first edition and a second edition;
a database comprising at least one table that is associated with the application; and
a server including:
  a processor; and
    a non-transitory computer-readable medium storing instructions implementing a redefinition tool that is executable by the processor, wherein the redefinition tool is configured to upgrade the application without interrupting operation of the application during the upgrade from the first edition to the second edition of the application by:
      forming partitions in the at least one table such that each partition in the at least one table contains different data, each of the different data relevant to the edition of the application associated with the partition as indicated by the edition column, and wherein the data are configuration data and reference data used by the respective edition of the application controlling the application's behavior;
      creating a new view for the second edition of the application, wherein the new view corresponds to a partition relevant to the second edition of the application and is different form an old view that corresponds to a partition relevant to the first edition of the application;
      concurrently providing the old view and the new view for the at least one table, thereby making the updated edition available to users while the pre-updated edition of the application is also accessible by the users so as to maintain continuous operation of the application; and
      removing a partition in the at least one table that is associated with an edition preceding the updated edition, thereby removing all data in the at least one table that is used by the edition preceding the updated edition.

16. The system of claim 15, wherein the first edition and the second edition are concurrently accessible by users.

17. The system of claim 15, wherein the redefinition tool allows data values of an existing column in a partition to be modified.

18. The system of claim 15, wherein the redefinition tool allows data definitions in a partition to be modified.

19. The system of claim 15, wherein the edition preceding the updated edition is at least two editions prior to the updated edition.

\* \* \* \* \*